(12) United States Patent
McConnell et al.

(10) Patent No.: US 7,614,196 B2
(45) Date of Patent: Nov. 10, 2009

(54) PAD FOR WALL PANEL AND FORMING PROCESS

(75) Inventors: Anthony McConnell, Zeeland, MI (US); Randolph Woellper, Hudsonville, MI (US)

(73) Assignee: Haworth, Inc., Holland, MI (US)

( * ) Notice: Subject to any disclaimer, the term of this patent is extended or adjusted under 35 U.S.C. 154(b) by 912 days.

(21) Appl. No.: 11/105,636

(22) Filed: Apr. 14, 2005

(65) Prior Publication Data

US 2005/0193666 A1 Sep. 8, 2005

Related U.S. Application Data

(63) Continuation-in-part of application No. 10/267,392, filed on Oct. 9, 2002, now Pat. No. 6,951,592.

(51) Int. Cl.
*E04B 1/38* (2006.01)
*E04H 1/00* (2006.01)

(52) U.S. Cl. ............. 52/511; 52/145; 52/222; 52/239; 52/489.1; 160/327; 160/371

(58) Field of Classification Search ............. 52/144, 52/145, 796.1, 797.1, 800.1, 800.11, 474, 52/483.1, 63, 222, 273, 239, 511, 489.1; 160/351, 135, 327, 328, 371, 377
See application file for complete search history.

(56) References Cited

U.S. PATENT DOCUMENTS

| 1,836,354 | A |   | 12/1931 | Abrams |
|---|---|---|---|---|
| 2,149,882 | A | * | 3/1939 | Clements ............. 228/142 |
| 2,150,476 | A | * | 3/1939 | Woodall ............... 52/222 |
| 2,485,648 | A | * | 10/1949 | Norquist ............. 29/469.5 |
| 3,075,862 | A | * | 1/1963 | Hoyer ................ 428/130 |
| 3,517,427 | A | * | 6/1970 | Bainter et. al. ........ 29/897.2 |
| 3,762,116 | A | * | 10/1973 | Anderson et al. ......... 52/239 |
| 3,885,008 | A |   | 5/1975 | Martin |
| 4,000,594 | A |   | 1/1977 | Kirk, Jr. |
| 4,334,374 | A | * | 6/1982 | Spamer et al. ......... 40/607.02 |

(Continued)

FOREIGN PATENT DOCUMENTS

EP 443084 A2 * 8/1991

OTHER PUBLICATIONS

Auto 'V' grooving Inc., Home Page, www.vgrooving.com, 3 pages Oct. 30, 2001.

(Continued)

*Primary Examiner*—Brian E Glessner
(74) *Attorney, Agent, or Firm*—Flynn, Thiel, Boutell & Tanis, P.C.

(57) ABSTRACT

Cover pads for use on upright walls, wherein the pad provides an improved internal support which is of simplified construction, for example the center support and the surrounding frame being made of a one-piece monolithic support structure which permits a flexible covering to be attached to the center support and the exterior side surfaces of the edge frame while the covering and support structure are in a flat and planar condition, following which the edge frame is folded and secured into position around the center support. The internal support structure for the pad, when in a flat condition, has voids at the corners so that the covering can be tucked into the corners prior to the edge frame being folded into its frame-defining position.

6 Claims, 15 Drawing Sheets

U.S. PATENT DOCUMENTS

| | | | |
|---|---|---|---|
| 4,704,837 A * | 11/1987 | Menchetti et al. | 52/631 |
| 4,729,917 A | 3/1988 | Symdra et al. | |
| 5,111,579 A | 5/1992 | Andersen | |
| 5,129,202 A | 7/1992 | Payne et al. | |
| 5,172,530 A | 12/1992 | Fishel et al. | |
| 5,174,086 A | 12/1992 | Payne et al. | |
| 5,230,377 A * | 7/1993 | Berman | 160/327 |
| 5,423,151 A | 6/1995 | Caro et al. | |
| 5,768,841 A * | 6/1998 | Swartz et al. | 52/281 |
| 5,809,715 A | 9/1998 | Tanaka | |
| 5,970,669 A * | 10/1999 | Livingston | 52/222 |
| 6,214,148 B1 | 4/2001 | Hill | |
| 6,223,485 B1 | 5/2001 | Beck et al. | |
| 6,226,849 B1 | 5/2001 | Beck et al. | |
| 6,256,941 B1 | 7/2001 | Yu et al. | |
| 6,619,003 B2 * | 9/2003 | Von Arx et al. | 52/222 |
| 6,658,805 B1 * | 12/2003 | Yu et al. | 52/239 |
| 6,679,013 B2 * | 1/2004 | Hornung | 52/204.62 |
| 6,748,997 B2 * | 6/2004 | Fricano et al. | 160/135 |
| 6,805,185 B2 * | 10/2004 | Gravel et al. | 160/135 |
| 6,951,592 B2 * | 10/2005 | McConnell et al. | 156/211 |
| 7,178,300 B2 * | 2/2007 | Elsing | 52/476 |
| 7,225,852 B2 * | 6/2007 | McConnell et al. | 160/351 |
| 2004/0071933 A1 * | 4/2004 | McConnell et al. | 428/119 |
| 2005/0150616 A1 * | 7/2005 | McConnell et al. | 160/368.1 |
| 2005/0193666 A1 * | 9/2005 | McConnell et al. | 52/309.8 |
| 2007/0214625 A1 * | 9/2007 | Brown et al. | 29/91.1 |

OTHER PUBLICATIONS

Auto 'V' grooving Inc., 'V' Groovers, www.vgrooving.com/products.htm, 3 pages, Oct. 30, 2001.
Auto 'V' grooving Inc., Solid Surface, www.vgrooving.com/prod01.htm, 3 pages, Oct. 30, 2001.
Auto 'V' grooving Inc., LG-1-SS, www.vgrooving.com/lg-1-ss.htm, 3 pages, Oct. 30, 2001.
Auto 'V' grooving Inc., LG-2-SS, www.vgrooving.com/lg-2-ss.htm, 3 pages, Oct. 30, 2001.
Auto 'V' grooving Inc., AVG-49-UMFT, www.vgrooving.com/avg-48-m.htm, 3 pages, Oct. 30, 2001.
Auto 'V' grooving Inc., Wood/Panel, www.vgrooving.com/prod02.htm, 5 pages, Oct. 30, 2001.
Auto 'V' grooving Inc., High Volume www.vgrooving.com/prod03.htm, 2 pages, Oct. 30, 2001.
Auto 'V' grooving Inc., Fold/Glue, www.vgrooving.com/Fold/glue.htm, 3 pages, Oct. 30, 2001.
Auto 'V' grooving Inc., Lineal 'V', www.vgrooving.com/lineal.htm, 3 pages, Oct. 30, 2001.
Auto 'V' grooving Inc., Cross 'V', www.vgrooving.com/cross.htm, 4 pages, Oct. 30, 2001.
Auto 'V' grooving Inc., Automatic Line, www.vgrooving.com/automati.htm, 4 pages, Oct. 30, 2001.

* cited by examiner

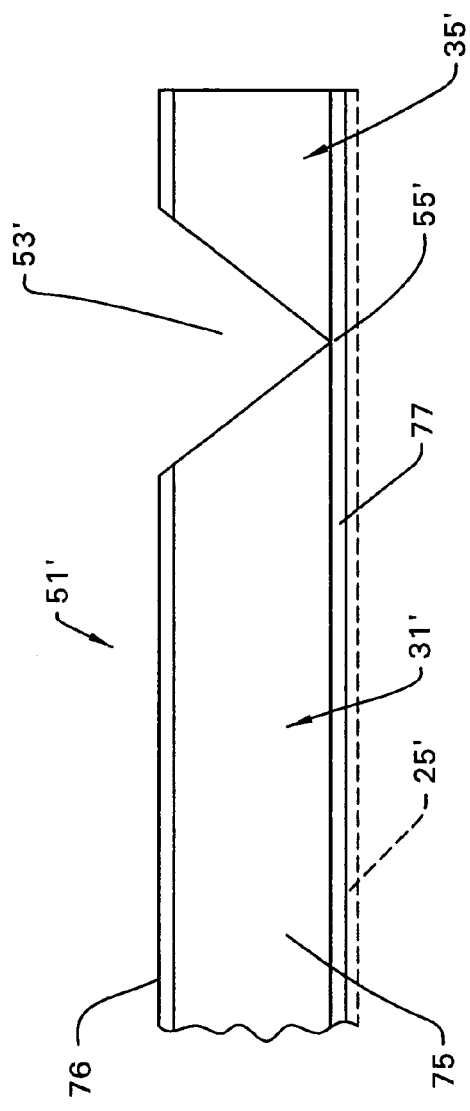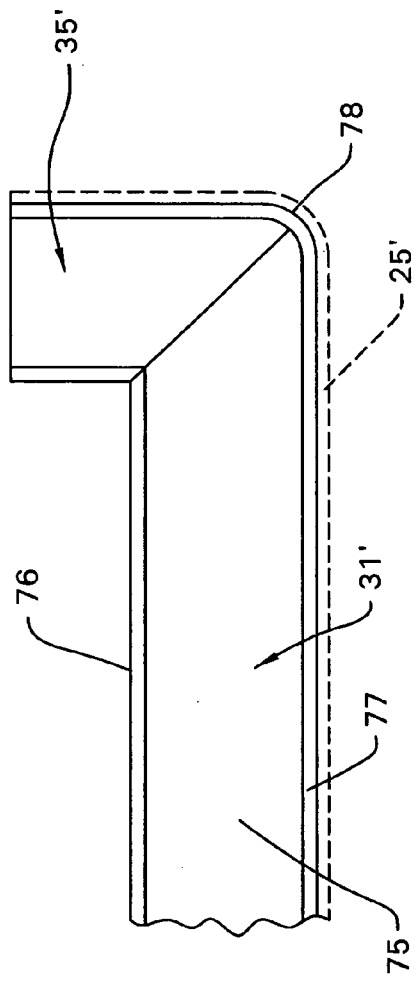

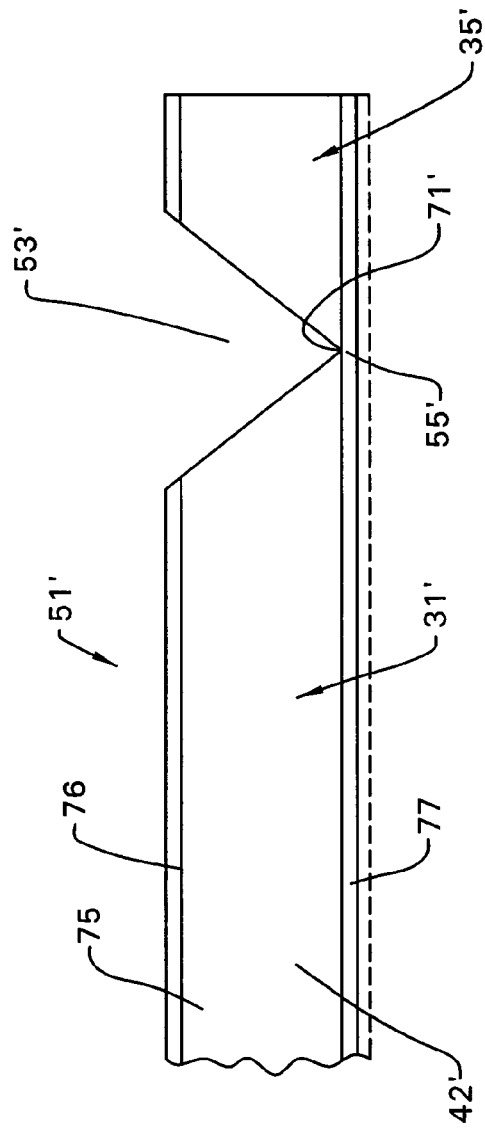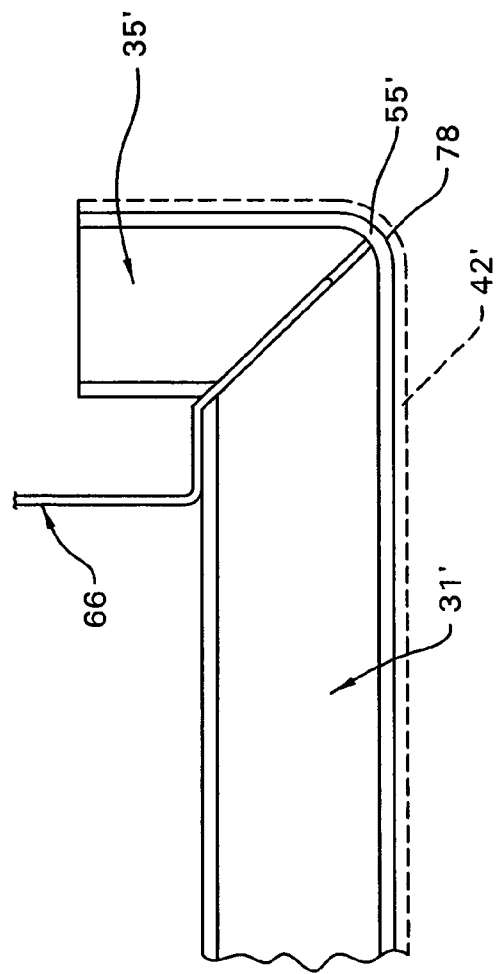

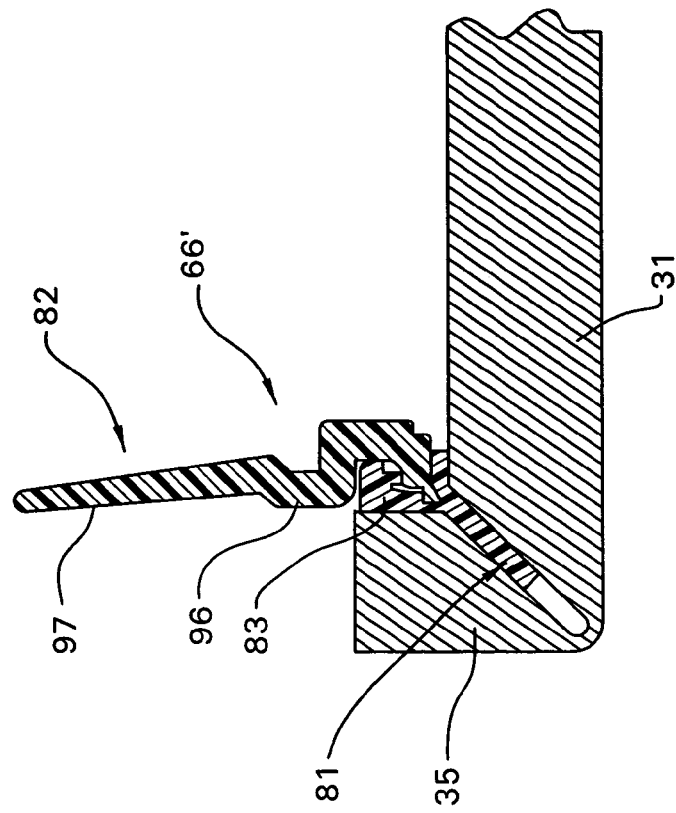
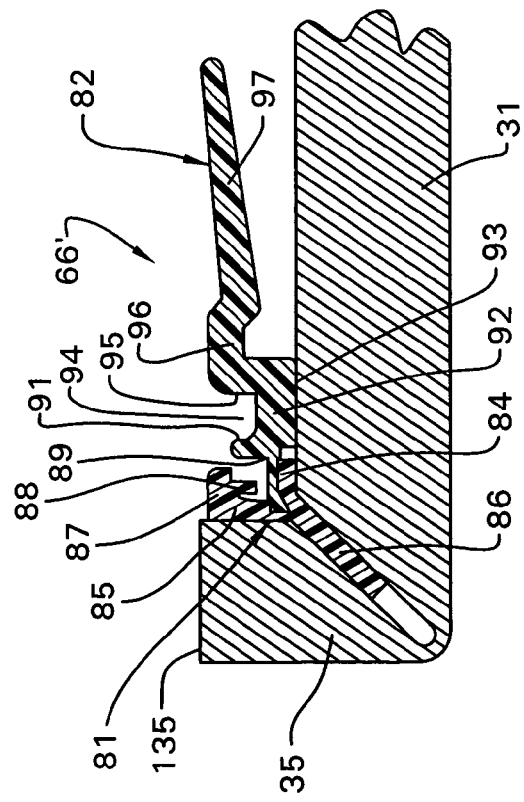

PAD FOR WALL PANEL AND FORMING PROCESS

This application is a continuation-in-part of prior copending application Ser. No. 10/267,392, filed Oct. 9, 2002, now U.S. Pat. No. 6,951,592, and claims the benefit of the filing date thereof under the provisions of 35 U.S.C. §120.

FIELD OF THE INVENTION

This invention relates to a cover pad for attachment to a wall such as for attachment to the frame of an upright space divider wall panel and, more specifically, to an improved pad structure and a process of manufacturing same.

BACKGROUND OF THE INVENTION

Interior space dividing wall systems as used in offices and the like typically incorporate a plurality of interconnected portable wall panels which often permit accessories such as worksurfaces, storage units and other devices or structures to be mounted thereon. The wall panels generally include an interior upright frame which mounts, frequently releasably, cover pads or tiles on one or both sides thereof. The cover pads are typically provided with an outer cloth or fabric covering to provide the wall panel with a desirable appearance. Such cover pads require an internal supporting and rigidifying structure which may be defined by a rigid sheet of material such as metal, particle board, mineral board or the like, and/or an internal frame similar to an open picture frame. The internal structure of the pad then has the external face thereof covered with a thin sheet of flexible fabric or similar covering material. The flexible covering is also typically wrapped around the edges and corners of the internal structure. The covering is then secured by clips or adhesive to the internal structure.

Cover pads having constructions similar to those described above are well known, but as is well recognized in this industry, such pads possess structural and manufacturing complexities which cause the construction of such pads to be undesirably inefficient and costly, and which also result in the pads having a less than desirable appearance, particularly at the corners.

More specifically, the attachment of the flexible covering, i.e. the fabric, requires significant manual manipulation to effect aligning and stretching of the fabric across the exposed face of the internal structure. And, the wrapping and securing of the fabric around the edges is further complicated by the necessity of folding and inwardly tucking the excess fabric which exists at the corners, which operation generally requires significant manual handing of the fabric and often results in fabric wrapped corners of inconsistent quality and hence less than desired appearance. In addition, the internal structure of the pad and the typical requirement for an internal frame cause the pad to have an undesired number of parts which increases manufacturing complexity and cost.

Accordingly, the present invention relates to improvements associated with cover pads for use on upright walls, which improvements simplify the construction and manufacturing of the pad so as to overcome or at least minimize some of the disadvantages associated with presently known pads.

More specifically, the pad of this invention provides an improved internal support which is of simplified construction, for example the center support and the surrounding frame being made of a one-piece monolithic support structure, which permits the flexible covering, such as fabric, to be attached to the center support and the exterior side surfaces of the edge frame while the fabric and support structure are in a flat and planar condition, following which the edge frame is folded and secured into position around the center support. The internal support structure for the pad, when in a flat condition, has voids at the corners so that the covering can be easily tucked into the corners prior to the edge frame being folded into its closing or frame-defining position.

Other advantages, objects and/or purposes of the invention will be apparent to persons familiar with constructions of this general type upon reading the following specification and inspecting the accompanying drawings.

BRIEF DESCRIPTION OF THE DRAWINGS

FIG. 20 is a fragmentary sectional view similar to FIG. 9 but illustrating a modified construction of the flat support pad or blank having a V-groove therein.

FIG. 21 is a fragmentary sectional view which illustrates the V-grooved blank of FIG. 20 in its folded frame-defining position.

FIG. 22 is a fragmentary sectional view which generally corresponds to the blank of FIG. 20 but is provided with a V-groove therein having a flat or widened apex similar to FIG. 19.

FIG. 23 illustrates the blank of FIG. 22 folded into its frame-defining position, and illustrating the manner in which an attachment clip or other device can be accommodated within the closed groove of the blank.

FIG. 25 is a fragmentary sectional view taken generally along line 25-25 in FIG. 24 and showing the attachment clip in the folded position.

FIG. 26 is a fragmentary sectional view corresponding to FIG. 25 but showing the attachment clip in its open position for installation on a wall panel frame.

Figure 1:
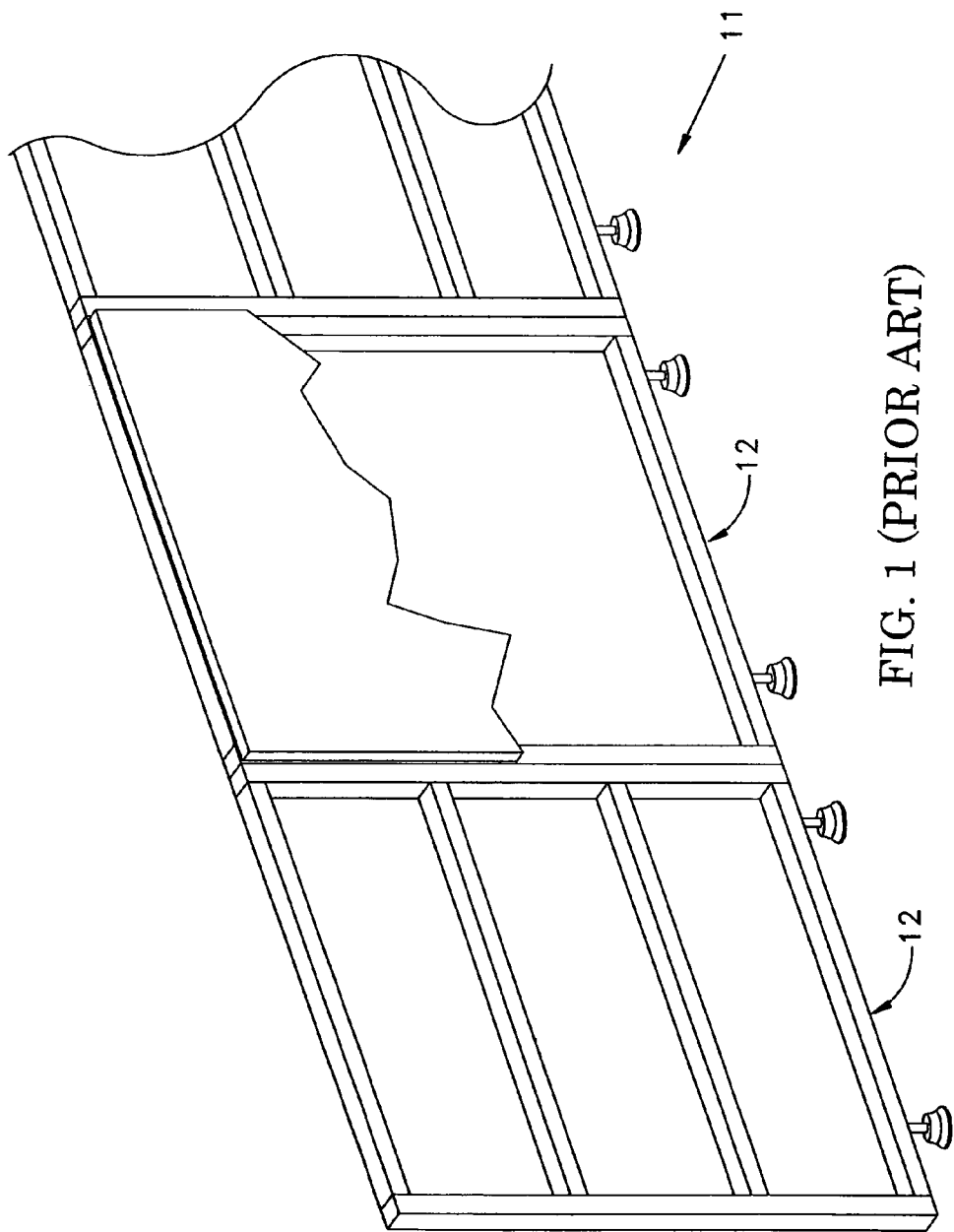
FIG. 1 is a perspective view of a known wall panel system having one or more cover pads associated with one and typically both sides thereof.

Certain terminology will be used in the following descriptions for convenience in reference only, and will not be limiting. For example, the words "inwardly", "outwardly", "rightwardly" and "leftwardly" will refer to directions in the drawings to which reference is made. Said terminology will include the words specifically mentioned, derivatives thereof, and words of similar import.

DETAILED DESCRIPTION

Figure 2:
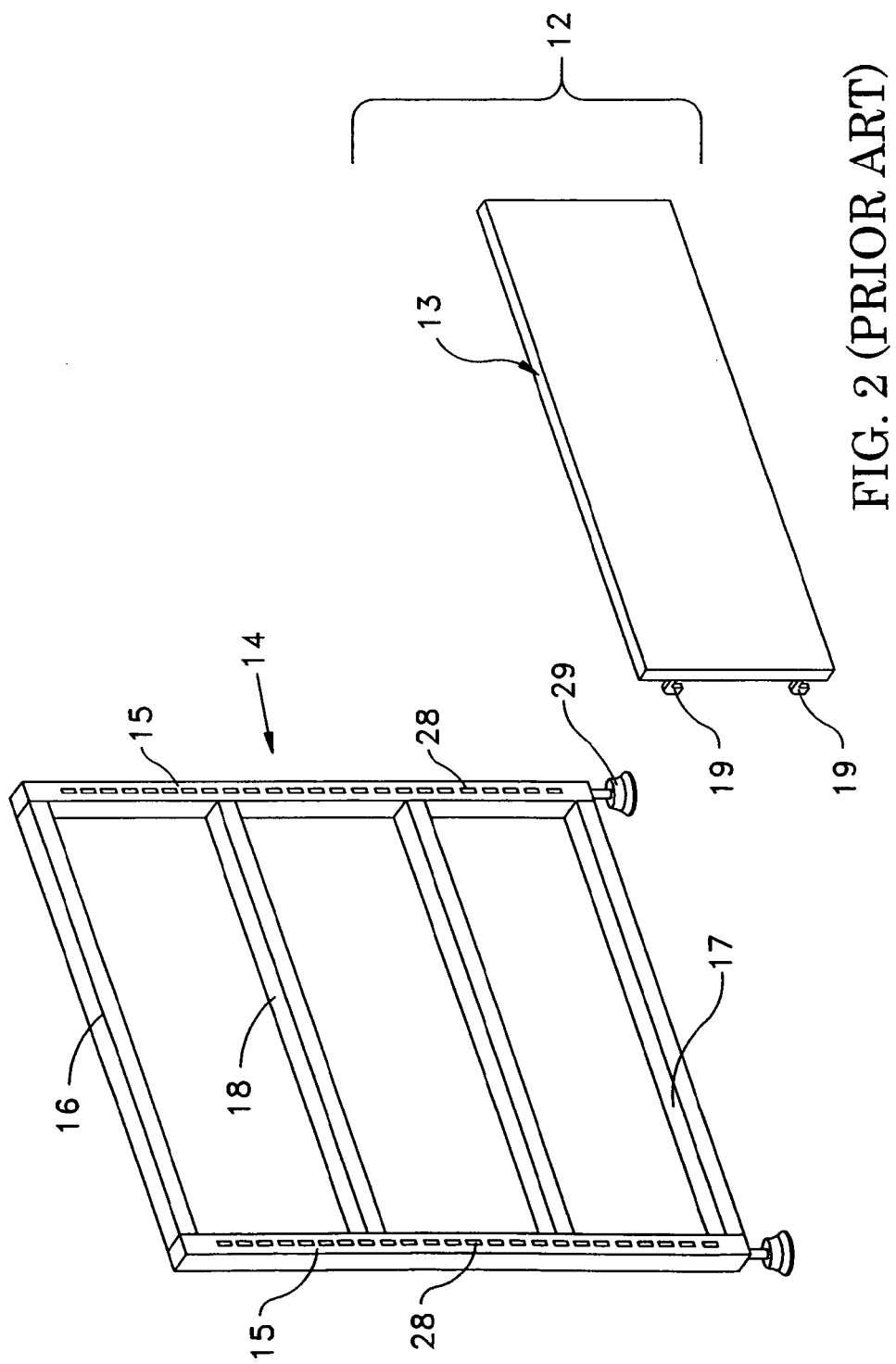
FIG. 2 is a perspective view which illustrates the internal frame of a known wall panel, and further illustrates a typical cover pad shown in a separated position relative to the frame.
Figure 3:
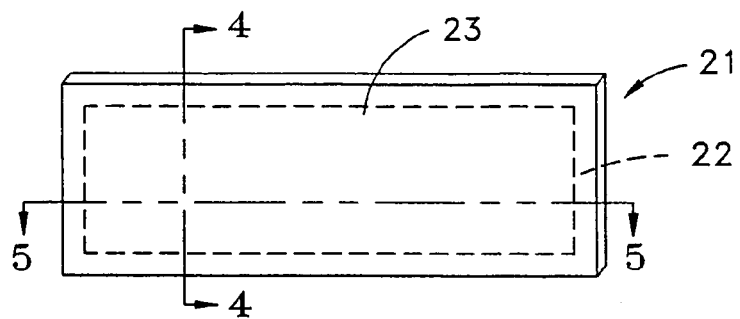
FIG. 3 is a front perspective view of a cover pad according to the present invention.

Referring to FIGS. 1 and 2, there is illustrated part of an upright interior wall system 11 defined by a plurality of upright panels 12 which connect together horizontally in aligned and/or nonaligned relationship to define an upright wall for dividing interior spaces. Such wall systems 11 are conventionally utilized in offices and the like for dividing large interior spaces into smaller workspaces, and the wall system typically utilizes wall panels 12 which are either factory or on-site assembled, and are supported on a conventional floor and project upwardly to a desired height which, in most use situations, is less than ceiling height.

In the illustrated arrangement, the wall panel 12 as depicted in FIG. 2 includes one or more cover pads or tiles 13 which mount on one or both sides of an interior rigid frame 14. The frame 14 conventionally includes a pair of parallel and sidewardly spaced elongate uprights or edge rails 15 which have the upper ends rigidly joined by a generally horizontally-extending top cross rail or beam 16, with a further horizontally-extending bottom cross rail or beam 17 being joined between the uprights 15 adjacent the lower ends thereof. The uprights 15 and beams 16-17 hence define a rigid upright frame of rectangular configuration which is open in the interior thereof and which, in many applications, is provided with one or more intermediate horizontally-extending cross rails or beams 18 disposed in vertically spaced but parallel relationship between the beams 16 and 17 and extending between and rigidly joined to the uprights 15. The cover tiles 13 are conventionally provided with some type of securing clip, such as the hooks 19 illustrated in FIG. 2, which are releasably engageable with the frame for permitting the cover tiles to be attached to the exterior side surfaces of the frame. In one conventional technique, the uprights 15 are provided with a plurality of slots 28 positioned within a row extending vertically, i.e. longitudinally, along the upright for permitting the hooks 19 to be engaged therein.

The frame also typically mounts adjustable feet or glides 29, which can be mounted to the lower ends of the uprights 15 if desired, for supportive engagement with the floor.

The overall panel system, and more specifically the wall panel construction described above, is conventional and illustrates one of many conventional systems with respect to the manner of constructing the panel frame and the attachment of the cover pads thereto.

Referring now to FIGS. 3-10, there is illustrated an improved construction of a cover pad 21 according to the present invention. The cover pad 21 is intended for releasable securement to the sides of an upright wall panel frame, such as a frame similar to that illustrated by FIGS. 1 and 2.

The cover pad 21 in its assembled condition includes a generally ring-shaped edge frame 22 which is rigidly secured to and projects rearwardly from a main center pad 23 which extends coextensively of the exterior side of the cover pad. The frame 22 and center pad 23 define the internal support structure for the cover pad, which internal support structure is exteriorly covered by an outer covering 25 defined by a thin and flexible sheet of covering material typically a fabric (i.e. cloth) material.

Figure 4:
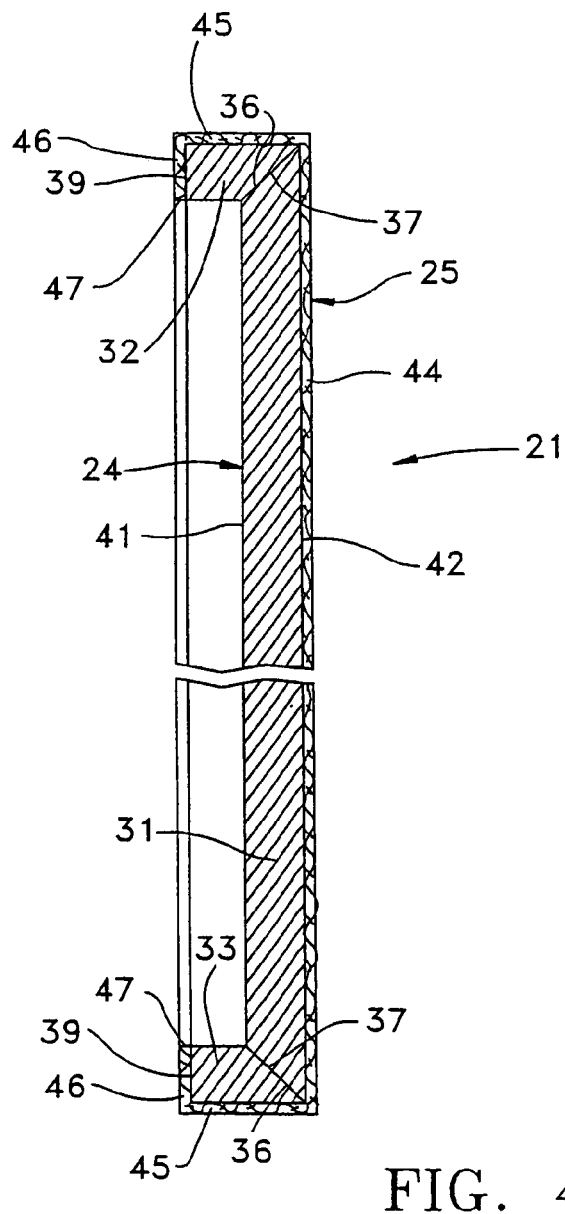
FIGS. 4 and 5 are enlarged fragmentary views taken along lines 4-4 and 5-5, respectively, in FIG. 3.
Figure 5:
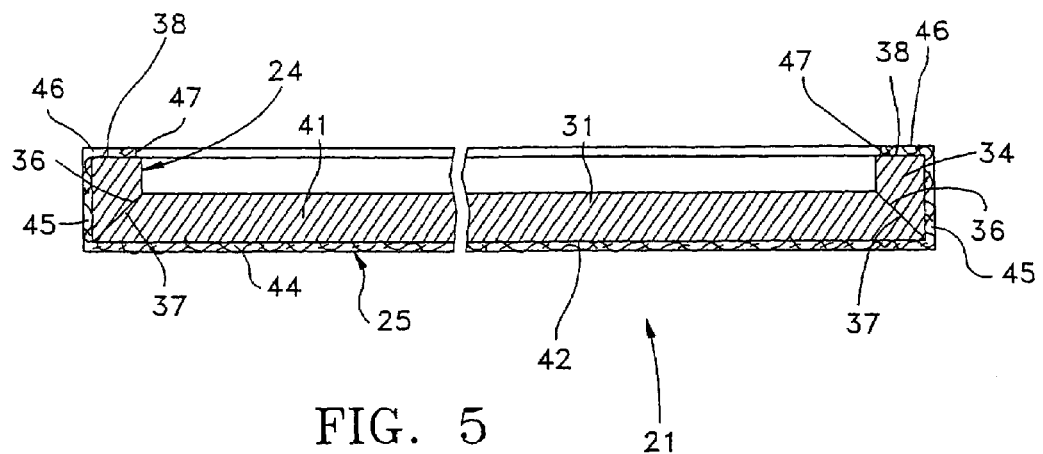
Figure 6:
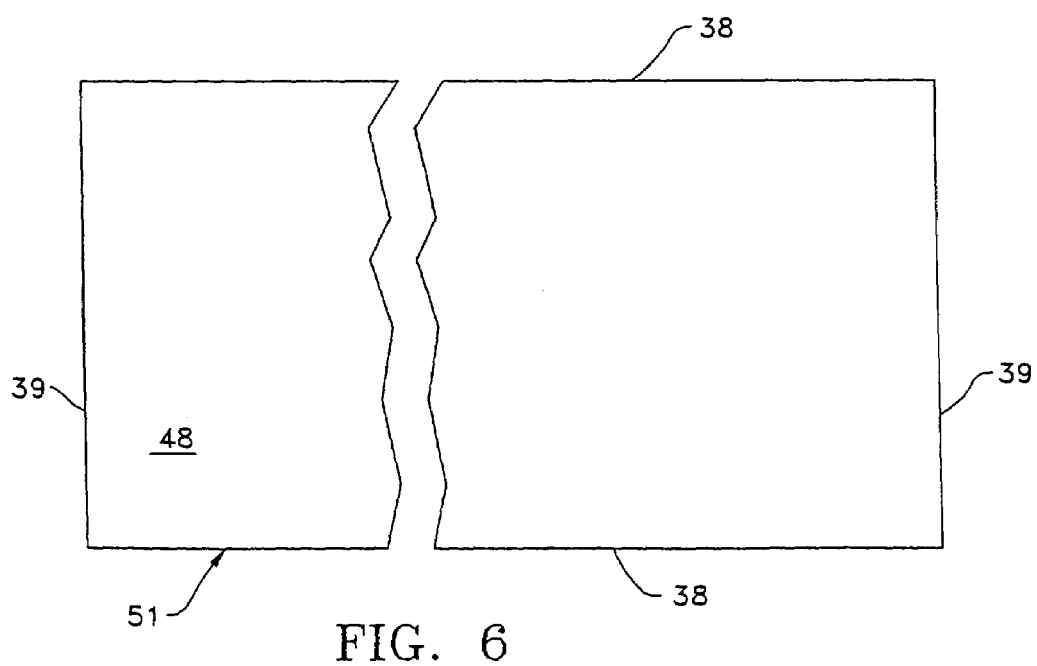
FIG. 6 illustrates the front non-grooved surface of a blank which defines the internal support structure of the pad, prior to folding of the blank.

The rigid rectangular frame 22, as illustrated by FIGS. 4 and 5, is defined by generally parallel top and bottom edge members 32 and 33 respectively, which extend lengthwise throughout the length of the pad 21 and, at opposite ends, cooperate with the respectively adjacent ends of parallel side edge members 34 and 35 which extend vertically throughout the height of the pad member 21 in typically perpendicular relationship to the top and bottom edge members 32-33. Each of the edge members 32-35, adjacent the front end thereof, defines thereon a tapered or beveled surface 36 which extends across the width of the edge member and which effectively abuts a respective corresponding opposed bevel surface 37 associated with the respective edge of a center pad part 31. These opposed bevel surfaces 36 and 37 are compatible so as to effectively define a 90° angle between the edge members 32-36 and the main center panel part 31, with the angle on the individual beveled surfaces 36 and 37 typically each being 45° relative to the substantially flat and planar front surface of the center pad part 31. The opposed beveled surfaces 36 and 37 are typically fixedly secured together, such as by a suitable adhesive or glue or bonding agent being provided between the opposed engaging beveled surfaces.

The upper and lower edge members 32-33 of the ringlike edge frame define thereon rear surfaces 38 which are substantially coplanar with rear surfaces 39 defined on the side edge members 34-35. The plane defined by the rear surfaces 38-39 of the edge frame is generally parallel with but spaced rearwardly from the plane defined by the rear surface 41 of the main support pad 23.

The main support pad part 31 defines thereon a generally planar front or exterior surface 42 which, at the peripheral edges thereof, defines right angle corners with respect to the side or exterior surfaces 43 defined by the edge members 32-35. These side exterior surfaces 43 hence project rearwardly from the front surface 42 in generally perpendicular relationship thereto.

The thin flexible outer covering material 25, for example a thin sheet of flexible fabric, includes a main or center fabric part 44 which extends coextensively over the front surface 42 of the center support pad 31, with the fabric being wrapped around the outer corners of the center support pad so as to include side fabric portions 45 which cover the side exterior surfaces 43 of the ringlike edge frame. The flexible fabric sheet 25 is additionally preferably wrapped around the outer rear corner of the edge frame so as to have rear fabric portions 46 which typically at least partially cover the rear surfaces 38-39 of the edge frame, with the fabric sheet terminating in a free edge 47. The fabric sheet is preferably fixedly secured to at least the edge frame, such as by being adhesively bonded or secured to at least the edge members 32-35 so as to maintain the center fabric part 44 stretched flatly (for example tautly) across the front surface 42.

The pad 21 of this invention possessing the above described constructional features is preferably manufactured utilizing a process similar or corresponding to the process as described below.

There is initially provided a generally rigid support pad or blank 51 (FIGS. 6 and 7) which has generally parallel and flat front and rear surfaces 48 and 49, respectively, with the blank 51 typically being of a generally rectangular configuration defined by the edge walls 38 and 39. The blank can be constructed of wood or other suitable materials, as explained hereinafter, so as to have a generally rigid construction, with the blank of desired dimensions being suitably initially formed, such as by being cut from larger sheets if necessary or desired.

Figure 7:
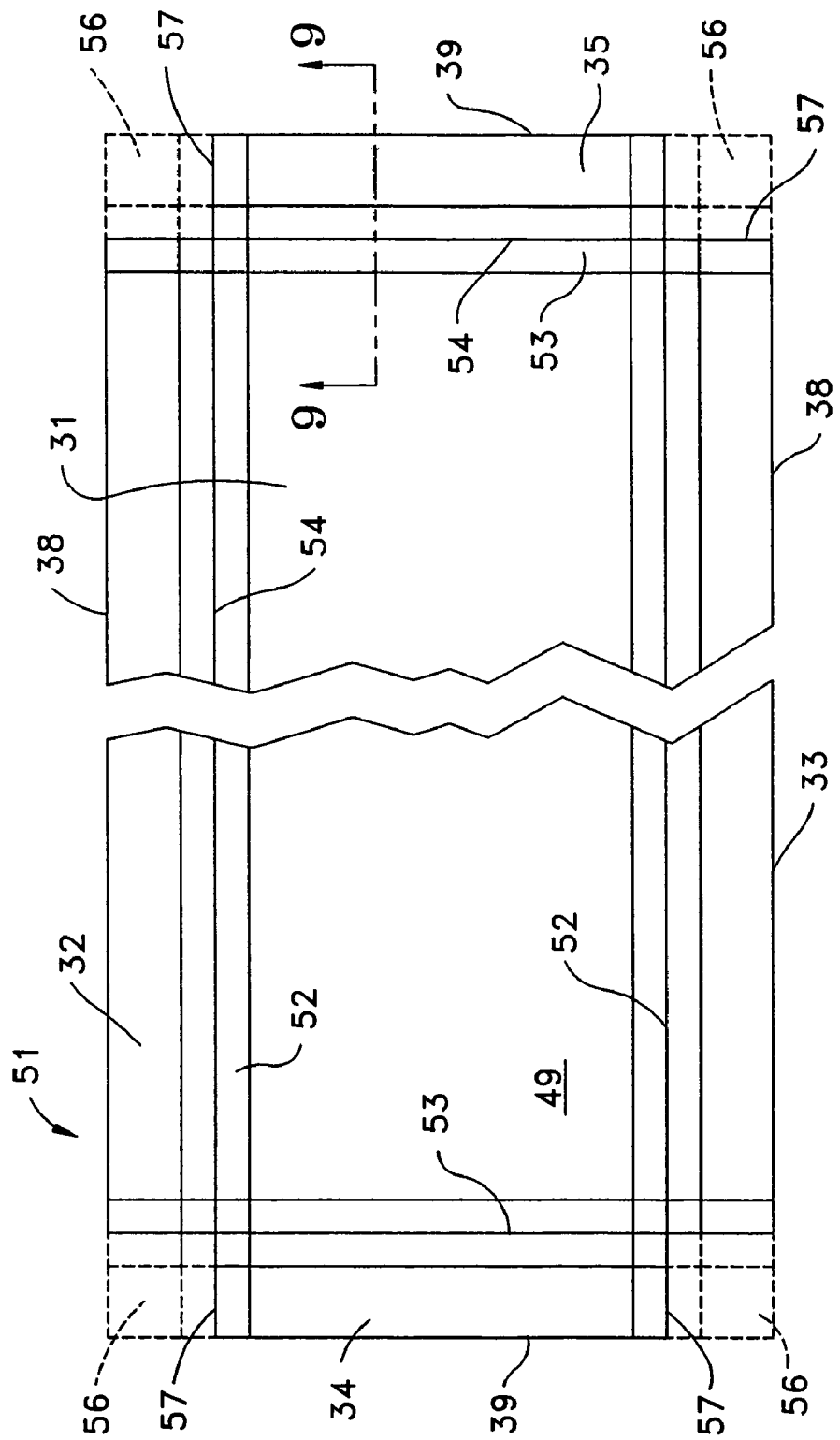
FIG. 7 illustrates the rear surface of the blank shown in FIG. 6 after the blank has been grooved.
Figure 8:
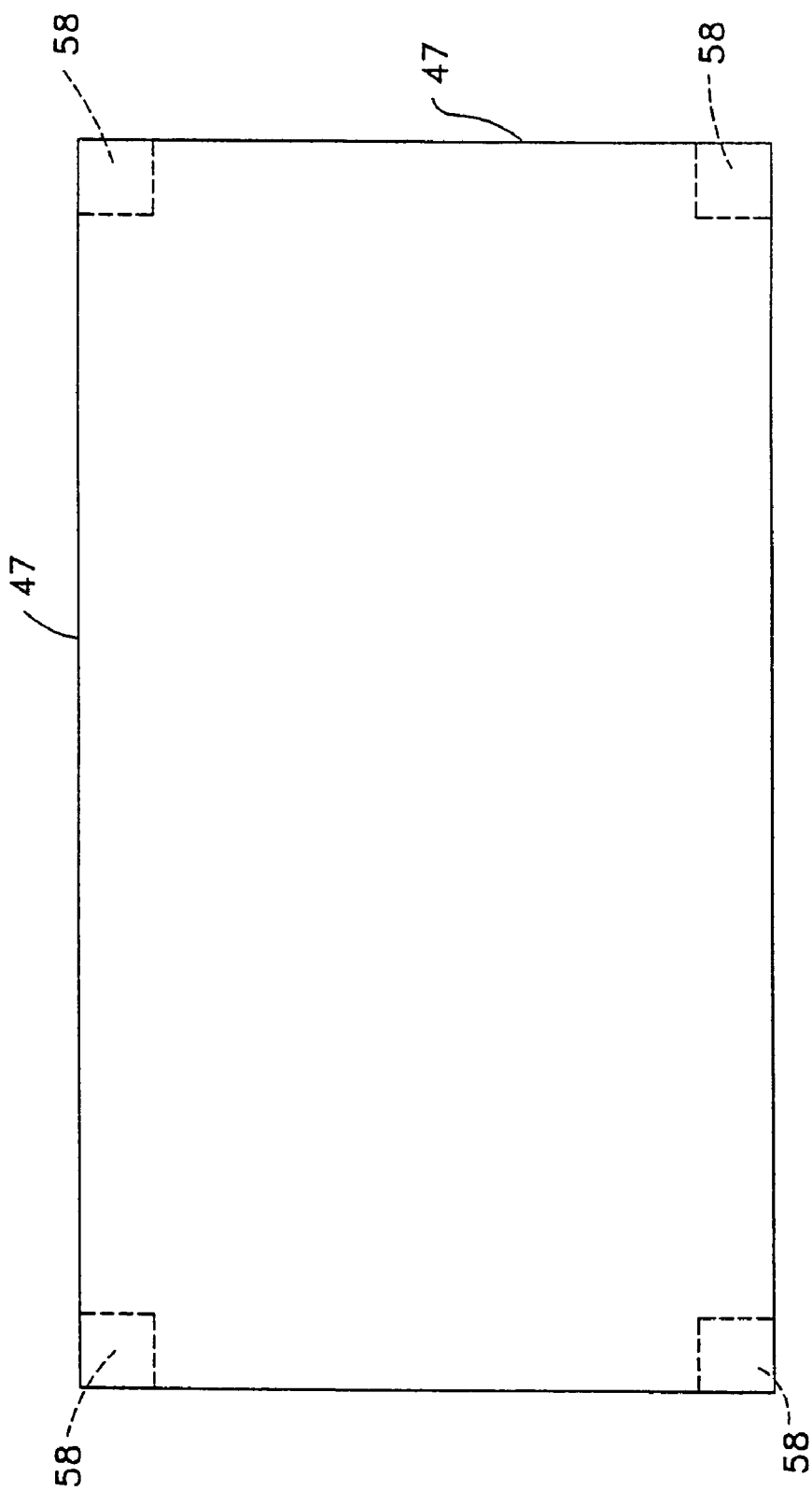
FIG. 8 illustrates a sheet of flexible covering material, for example fabric, which is to be superimposed over and adhesively secured to the blank shown in FIG. 6.
Figure 9:
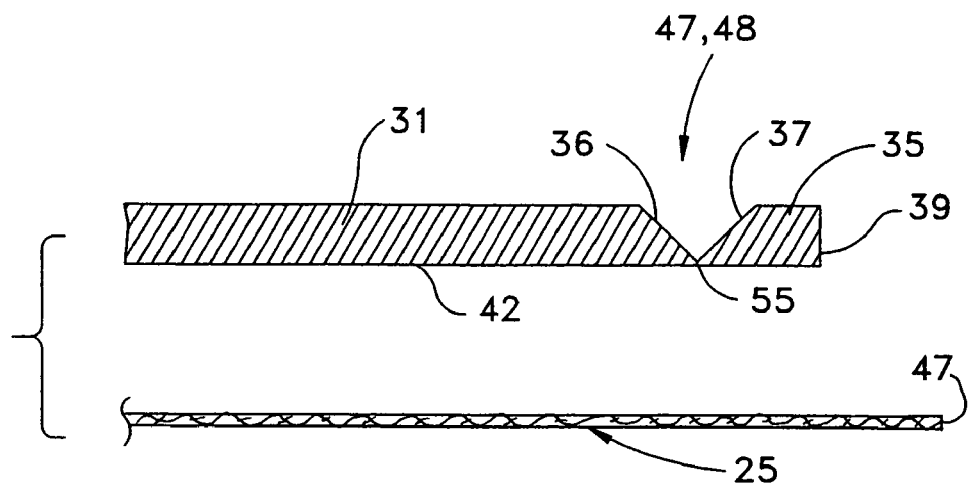
FIG. 9 is an enlarged fragmentary sectional view taken generally along lines 9-9 in FIGS. 7 and 8 and showing the blank and fabric in separated but superimposed relationship.

The support blank 51 is subjected to subsequent forming steps which include forming, for example cutting, a pair of generally parallel channel-like grooves 52 into the blank from the rear surface 49 thereof. The grooves 52 are respectively disposed adjacent but spaced inwardly in parallel relationship from the adjacent side edges 38, and the grooves 52 extend longitudinally throughout the length of the blank. A further pair of generally parallel channel-like grooves 53 are formed, for example cut, into the blank from the rear surface 49 thereof, which grooves 53 are disposed adjacent but spaced inwardly from the respective end edges 39. The grooves 53 extend transversely across the width of the blank and hence intersect the grooves 52. The grooves 52 and 53 preferably have identical cross sections and, in the illustrated arrangement, preferably comprise V-shaped grooves which extend through substantially the entire thickness of the blank 51 except that the depth of the grooves 52 and 53 is preferably slightly less than the blank thickness so that the bottom of each groove, as defined by the apex 54 (FIG. 9) thereof, which apex also defines the lengthwise-extending centerline of the groove, is spaced a small distance from the front surface 48 of the blank 51 so as to leave a thin bridge or section 55 of blank material. The blank 51, after forming of the grooves 52 and 53 therein, remains as an integral and monolithic one-piece flat pad or plate which defines the main center support pad part 31 as well as the side edge members 32-35, all formed and integrally joined in a generally flat condition as illustrated in FIGS. 7 and 8. In this latter condition, the grooves 52 and 53 where they intersect result in formation of small generally rectangular corner parts 56 which, due to the presence of the bridge sections 55, remain integrally and rigidly joined to the blank. These corner parts 56 are ultimately removed and discarded, however, so as to leave generally rectangular recesses 57 associated with the corners of the blank. The corner parts 56 can be removed either before or after attachment of the fabric to the blank, as discussed below.

The grooved one-piece flat blank is attached, preferably by adhesive or glue, to the sheet of flexible covering material 25 which is also typically precut so as to have a rectangular configuration which corresponds to but is preferably slightly larger than the rectangular configuration of the blank 51. The exterior or front surface 48 of the grooved blank 51, and specifically those portions of the surface 48 corresponding to the edge or frame strips 32-35, are provided with adhesive or glue thereon, and then the grooved blank 51 and fabric sheet 25 are appropriately superimposed, with the sheet 25 being maintained in a flat and non-wrinkled condition so that the fabric sheet along a band which extends around the outer portion thereof becomes adhesively fixed to the outer surfaces of the edge strips 32-35. This adhesive securement of the fabric to the grooved blank occurs while both the fabric and the blank are in a generally flat and hence planar condition. In addition, the edge surfaces 38 and 39 are also preferably provided with adhesive or glue thereon, and the edge portions of the fabric sheet are wrapped upwardly to overlap and be adhesively secured to the edge surfaces 38 and 39. This latter step can be carried out automatically by suitable processing equipment, such as use of flexible membrane presses or the like, or can be carried out manually if desired.

As to the corner pieces 56, they can be removed prior to attachment of the fabric 25 to the blank 51 merely by breaking the corner pieces away from the blank due to flexing of the corner pieces, causing fracturing along the thin bridge sections 55. Alternately, the corner pieces 56 can remain attached to the blank 51 during the initial securement of the fabric to the exterior surfaces of the edge frame strips 32-35, with the corner pieces 56 being fractured and removed prior to the edge portions of the fabric edges being wrapped upwardly and secured to the edge surfaces 38 and 39.

Once the flat fabric sheet 25 has been secured to the outer surfaces of the edge strips 32-35 and the corner pieces 56 have been removed, and in addition a strip of adhesive or glue is or has already been inserted into each of the grooves 52 and 53 throughout substantially the length thereof, then the opposed edge strips 32-33 and 34-35 are folded upwardly relative to the center pad part 31 so as to define a complete ring-shaped frame which is integrally joined to and extends around the periphery of the center pad part 31. More specifically, the corner portions 58 (FIG. 8) of the fabric sheet are lifted upwardly, either manually or mechanically, prior to all of the edge strips 32-35 being folded upwardly to define the continuous ring-shaped rectangular frame, whereby the corner fabric portions 58 are effectively clamped between the opposed ends of the edge strips 32-35 at each corner of the frame and hence create a tuck or fold of material 59 (FIG. 10) which is retained inside the frame rearwardly of the main pad part 31.

Explained in somewhat greater detail, merely as exemplary of one process for accomplishing the above, the opposed horizontal edge flanges 32 and 33 can be initially folded upwardly into transverse relationship with respect to the center pad part 31, which upward folding will, depending upon the material selected for the blank 51, cause the bridge sections 55 to either fracture or function as a living hinge, with the fabric 25 also functioning as a living hinge, whereby the opposed horizontal edge flanges 32-33 can be folded upwardly so that the opposed beveled surfaces 36 and 37 defining the grooves 52 hence effectively abut and become adhesively secured together. Thereafter the fabric corner portions 58 are either manually or mechanically folded upwardly and inwardly accompanied by upward folding of the opposed vertical edge strips 34-35, which latter folding of the edge strips 34-35 again causes the bridge sections 55 to either fracture or function as a living hinge, with the fabric also functioning as a living hinge for joining the bridge sections 34-35 to the main center part 31. The upward folding of the edge sections 34-35 again causes the opposed groove surfaces 36-37 to come substantially into contact with one another and to be adhesively secured together. At the same time, the upward closure of the edge strips 34-35 causes the fabric corner portions 58 to be clamped and hence trapped between the opposed beveled end surfaces 62-63 as defined at the opposed ends of each respectively adjacent pair of edge strips so that the excess corner fabric 58 is hence trapped and held internally behind the pad so that the finished exterior corner of the pad is entirely covered by fabric and has a neat appearance which is relatively free of wrinkles or bunching.

During the forming of the fabric-covered pad 21 as described above, it will be appreciated that the folding of the edge strips 32-35 may be in a sequential manner, or the edge strips may all be folded simultaneously, either being possible and acceptable, depending upon the selected forming process and specifically the types of fixtures and equipment utilized and the degree of selected automation associated therewith. To facilitate this process, it is contemplated that same can be carried out substantially entirely automatically utilizing appropriate fixturing and handling equipment, or the process may be carried out at least in part with manual assistance and manipulation provided in conjunction with appropriate fixtures.

With the present invention, the main interior support 24 which defines both the main center pad part 23 and the surrounding ring-shaped edge frame 22 can hence all be formed by a single support pad or blank 51 which, due to provision of appropriate grooves such as grooves 52 and 53 formed inwardly from the rear surface thereof, enables the fabric 25 to be secured to the opposite side of the blank, typically at least in the edge regions of the blank which define the edge members 32-35 prior to their being hinged into the transverse frame-defining position, whereby the blank and fabric hence can be adhesively secured together while each is maintained in a generally flat and one-piece condition to thus facilitate the securement of the fabric to the blank. This additionally enables the fabric to function as a living hinge, whereby the edge strips 32-35 can thereafter be pivotally folded through angles of about 90° into transverse orientations with respect to the main center pad part 23 to hence permit forming of the rigid ring-like frame 22 in surrounding relationship to the center pad 23, with this latter forming step additionally permitting the fabric corner portions 58 to be readily tucked into and clamped between the tapered end faces 62-63 formed on the edge strips 32-35 to thus permit simple forming of a clean fabric wrapped corner on the finished cover pad 21 while at the same time enabling the fabric to be adhesively secured to the outer surfaces of the edge strips 32-35 prior to the pivoting or folding thereof into the frame configuration. The frame configuration and its rearward protrusion with respect to the center pad 23 hence provides additional strength and reinforcement to the overall cover pad 21 while at the same time providing a finished cover pad having an appearance defined by clean and well-defined fabric-wrapped edges and corners.

The material defining the rigid blank 51 may be wood, for example particle board. Other alternative materials for the blank 51 include mineral board (for example Celotex) or low-density wood fiberboard such as Korlite. With the blank 51 made of these materials, the bridge sections 55 will typically fracture during folding of the edge members 32-35 into the frame-forming position so that the living hinge is hence defined principally by the fabric which attaches the edge members to the center pad 31.

As an alternate material for defining the blank 51, same could be constructed of what is known as R board, the latter being a polyurethane foam sheet having relatively thin fiberglass layers defined on opposite surfaces of the polyurethane sheet. When using R board for the blank 51, the grooves 52 and 53 will typically penetrate through one fiberglass surface layer and through the entire thickness of the polyurethane foam sheet, with the opposite fiberglass surface layer being utilized to define the bridge section 55 since the fiberglass surface layer will typically have a thickness of about 0.010 inch. When the blank 51 formed from R board has the edge members 32-35 thereof folded into the frame-defining position, the nongrooved fiberglass skin will typically not fracture but rather will function as a living hinge when the edge members 32-35 are folded into the frame-defining position. With the R board, the one fiberglass surface layer (i.e. skin) hence cooperates with the fabric to define a living hinge.

Referring to FIGS. 20-21, there is illustrated the construction of a blank 51' of an alternative material, such as a blank constructed of R board as described above. In the alternative construction illustrated by FIGS. 20-21, corresponding parts of the construction are designated by the same reference numerals utilized above but with the addition of a ' (prime) thereto.

More specifically, the blank 51' in this variation of the invention is generally of a laminated construction defined by a thick center core 75, such as of foam, having opposite surfaces thereof adhered to thin facing layers or sheets 76 and 77 which, if the blank is formed of R board, are typically thin fiberglass layers. With this construction of the blank 51', the V-grooves which extend parallel to each of the blank edges is constructed generally as illustrated by groove 53' (FIG. 20) in that the V-groove opens inwardly from the one surface layer 76 and extends through substantially the entire thickness of the center core 75, so that the apex of the groove terminates generally at the interface between the core 75 and the bottom surface layer 77. This latter surface layer 77 hence effectively defines the narrow bridge 55' at the apex of the groove 53'.

With the construction illustrated by FIG. 20, the grooved blank 51' can then have the edge parts thereof, as illustrated by the edge part 35', folded upwardly into the frame-defining position illustrated by FIG. 21, with the folding along each edge extending generally along the narrow bridge section 55'. In view of the nature of the thin surface layer 77, this layer 77 where it extends along the narrow bridge 55, effectively acts as a hinge and allows the edge parts 35' to swing up into the closed frame-defining position of FIG. 21, with the edge parts being secured to the center part 31' in the same manner as described above. Prior to folding of the edge parts 35' into the frame-defining position, however, the corner parts of the blank (corresponding to the corner parts 56 of FIG. 8) as defined by the upper layer 76 and center core 75 are removed by effecting their separation from the bottom layer 77, which bottom layer 77 at the corners is folded upwardly and clampingly held between the opposed end surfaces of the transverse edge parts 35' when the blank is formed into the frame in generally the same manner described above with respect to attachment of the covering 25.

In this manner the frame defined by the blank 51' can be defined solely by the blank, and the thin surface layer 77 of the blank is utilized to define the outer covering of the frame as illustrated by FIG. 21. Furthermore, in this construction the flexible covering layer 77 and the narrow bridge 55' defined therein results in creation of a more desirable rounded exterior corner 78 when the blank is folded to define a frame as illustrated by FIG. 1. This forming of the blank 51' into a frame (as shown by FIG. 1) may result in some compression and deformation of the material defining the center core 75, specifically in the region of the narrow bridge 55', but such does not result in any significant damage and in fact results in a more desirable rounding at the corner 78.

The blank 51' of FIG. 20 may also have a separate flexible covering 25' secured to the exterior surface of the thin surface layer 77 when the blank 51' is still in a flat condition, whereupon after removal of the corner parts (as defined solely by core layer 75 and upper surface layer 76), the remaining corner regions of both surface layer 77 and covering 25' are folded upwardly into the corner of the frame so as to be clampingly engaged between the adjacent upwardly-folded edge parts in the same general manner as described above relative to FIGS. 3-10.

The blank 51' having a laminated construction as illustrated may, in place of R board, be constructed similar to conventional gypsum board or wall board. In such case the center core layer 75 would be of compressed gypsum, and the surface layers 76-77 would be paper layers which, while thicker than a conventional paper sheet, would nevertheless still be relatively thin so as to have a thickness which is conventional with gypsum board. This paper bottom layer 77, particularly when the blank 51' is formed into a frame which is free of the flexible covering 25', permits other appropriate surface treating of the exterior surface of the assembled frame. For example, the exterior surface of the assembled frame, as defined by the exterior surface of the layer 77, can be painted or stained.

Other materials are believed suitable for defining the blank 51, including bio-fiber or Agri-fiber boards involving fibers such as flax or jute fibers secured with a polymer binder. Such materials when in plate form can additionally be molded with heat so as to permit embossing of the plate, particularly on the exterior surface thereof, so as to provide for variable surface treatments and the like.

The material defining the blank 51 will most typically have a thickness in the range of three-eighths to three-fourths inch, with a typical and preferred thickness being about one-half inch. However, with some of the materials used for defining the blank, such as a metal/plastic/metal sandwich, the thickness of the blank material may be as little as one-eighth inch.

When securing the fabric to the grooved blank 51, the fabric can be secured to the blank by means of adhesive which is applied over the entire exterior surface of the blank 51, or alternatively the adhesive may be applied solely to the exterior surfaces of the edge members 32-35. In addition, while the fabric edges can be wrapped around and adhesively secured to the end surfaces 38 and 39 of the edge strips, it will be appreciated that securement of the fabric edges to the end surfaces 38 and 39 can also be carried out using other securement techniques such as staples or the like since this surface of the finished cover pad 21 faces the panel frame and hence is hidden when the cover pad is mounted on the panel frame.

Rather than applying adhesive to the blank 51 and thereafter securing the fabric thereto, it will be appreciated that the adhesive securement of the fabric to the blank may make use of a meltable adhesive such as a hot melt applied initially to the back side of the fabric, prior to placement of the fabric on the blank 51, with the fabric after placement on the blank 51 then being heated such as within a bag-type membrane press so as to effect melting of the adhesive and securement of the fabric to the blank.

The process for forming the cover pad 21 of this invention, when the substrate is of wood or mineral board, is summarized as follows:

1. cutting the blank 51 from a larger sheet of material;
2. forming transverse and longitudinal grooves in the rear surface of the blank through substantially the full thickness of the blank except for a small bridge thickness, such as a thickness in the neighborhood of about 0.010 inch;
3. positioning the fabric over and adhesively securing the fabric to the exterior non-grooved surface of the blank, at least along the exterior surfaces of the edge members;
4. wrapping the fabric edges around the edges of the blank and securing the fabric to the blank edges, either adhesively or mechanically;
5. removing the corner pieces from the blank (if not already done during the blank forming step) so as to leave corner recesses which have fabric corner portions extending thereover;
6. folding the edge members of the blank inwardly into the frame-defining position and folding the fabric corner portions inwardly between the adjacent ends of the edge members to effect clamping of the fabric corners between the ends of the edge member;
7. inserting mounting clips, if used, between the opposed beveled surfaces defined between the edge members and the center pad part; and
8. securing the edge members in the folded position relative to the center pad part, either adhesively (for example a hot melt) or mechanically (for example staples or nails) to define a closed ringlike frame in surrounding relationship to the center pad part.

When the blank is formed from R-board or of materials having similar properties, then the same process steps can again be utilized, although the corner pieces of the blank will typically be removed from the blank prior to the fabric being adhesively secured to the exterior non-grooved surface of the blank.

Figure 11:
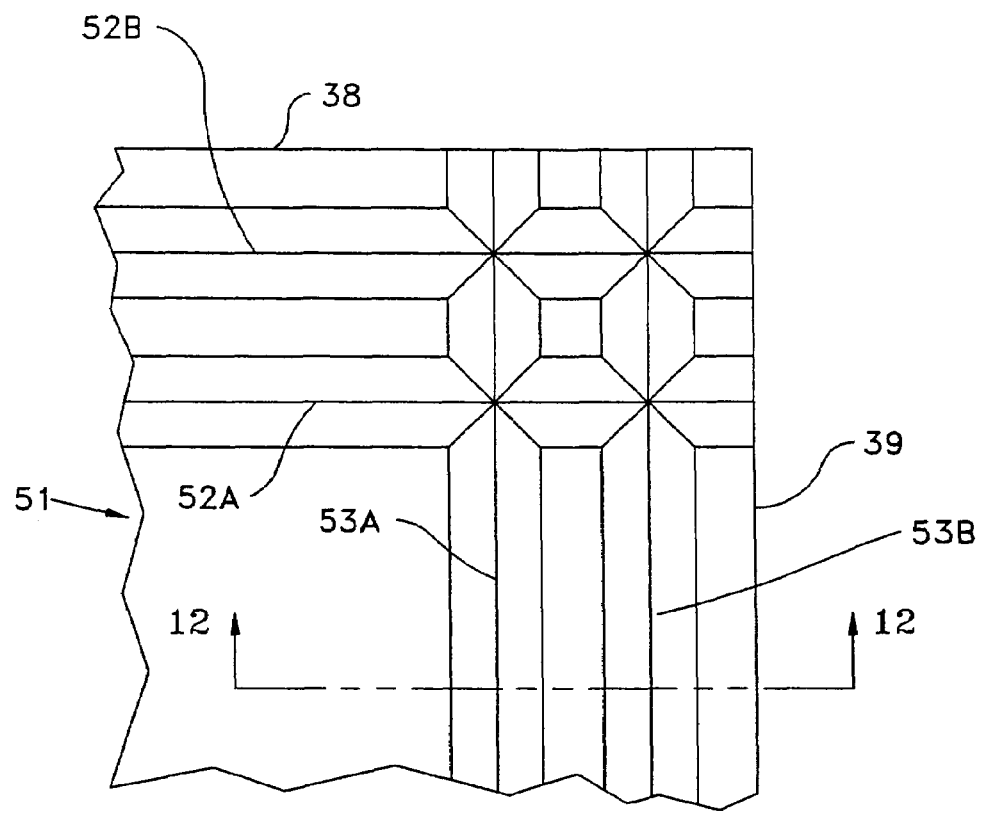
FIG. 11 is an enlarged fragmentary view showing the rear grooved surface of the blank employing a modified grooving arrangement, namely a double groove arrangement.
Figure 12:
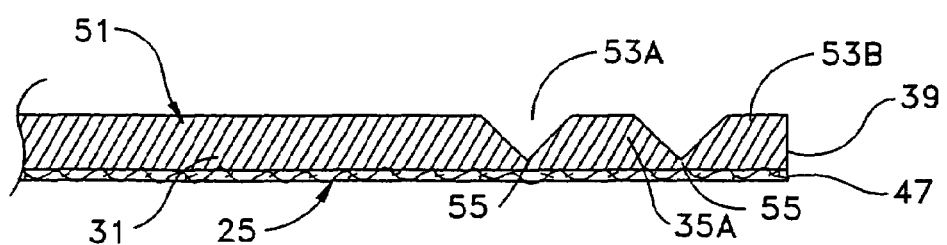
FIG. 12 is an enlarged sectional view taken generally along line 12-12 in FIG. 11 and showing the grooved blank in a flat condition and having the fabric secured to the non-grooved surface thereof.
Figure 13:
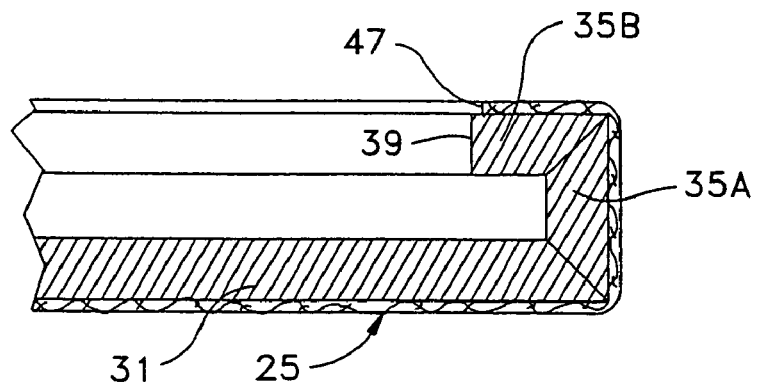
FIG. 13 shows the blank of FIG. 12, with the fabric secured thereto, in the folded secured position so as to define the rigid frame which is joined to and surrounds the main center substrate of the pad.

Referring now to FIGS. 11-13, there is illustrated a variation of the invention wherein each edge flange 32-35 of the blank 51 is defined by two parallel grooves such as by the grooves 52A-52B and 53A-53B, which are laterally spaced a small distance apart. The two grooves hence divide each edge flange into an intermediate flange part such as 35A and an outer flange part 35B. Each of the grooves 53A and 53B is again basically a 90° V-groove which penetrates through substantially the entire thickness of the blank except for the small bridge section 55, and in this variation the fabric 25 has the edge thereof terminating in engagement with the outer flange part 35B since there is no need to wrap the fabric around the edge surface 39. With this double 90° groove arrangement, and the resulting double edge flange construction, the edge flange 35A is folded upwardly to effect severing of the bridge associated with the inner groove 53A so that the intermediate flange part 35A hence projects rearwardly and defines the outer edge of the frame and of the cover pad, and the outer flange part 35B is additionally folded inwardly relative to intermediate flange part 35A to effect severing of the bridge at the bottom of groove 53B so that the flange part 35B as illustrated in FIG. 13 hence projects inwardly so as to be positioned rearwardly with respect to the main center pad part 23. Each of the grooves when in the folded position is provided with means for fixing the flanges in the folded position of FIG. 13, such as by means of an adhesive positioned within each groove. This double-grooved edge flange hence permits creation of a structurally more-robust frame while at the same time permitting the frame to have minimal front-to-back thickness so as to provide a slim cover pad.

Figure 14:
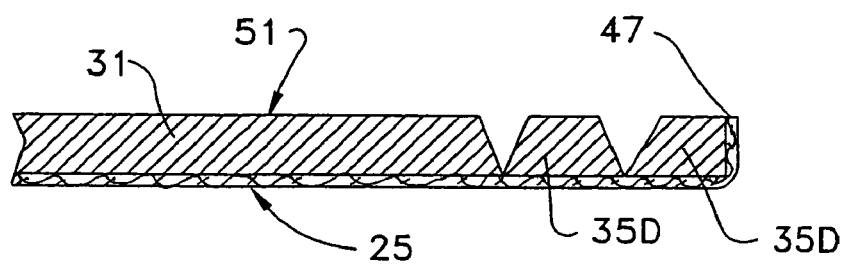
FIGS. 14 and 15 are sectional views which generally respectively correspond to FIGS. 12 and 13 but which illustrate a modified double groove arrangement so that the resulting frame provides an outer beveled corner.
Figure 15:
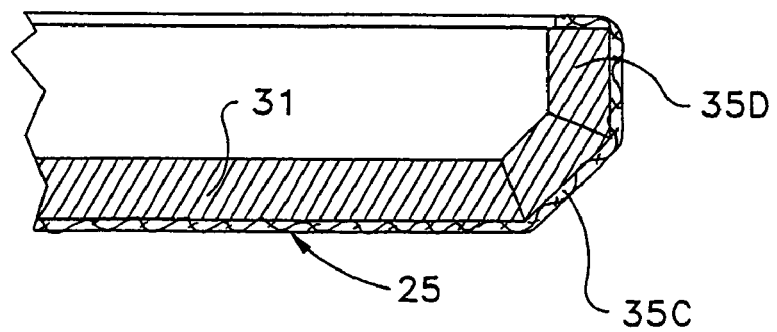

FIGS. 14 and 15 illustrate a further variation wherein the edge flanges associated with the blank are again of a double-groove construction similar to that illustrated by FIGS. 11-13. In this variation, however, the two grooves as designated 53C and 53D are of smaller angular extent, such as each being a 45° included angle V-groove, so that when the intermediate and outer edge flange parts 35C and 35D, respectively, are folded into the frame defining position illustrated by FIG. 15, the outer flange part 35D projects rearwardly and defines the outer periphery of the rigid frame, whereas the intermediate flange part 35C effectively joins at a 45° angle between the main pad part 23 and the outer flange part 35D so that the resulting pad has an exterior beveled corner. This hence permits elimination of the sharp exterior corner, and permits the pad to provide a different appearance.

Figure 16:
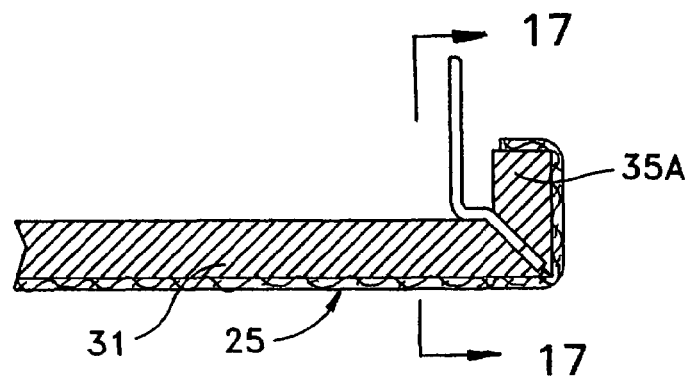
FIG. 16 is an enlarged fragmentary sectional view which illustrates the corner defined between the center substrate part and the folded edge flange defining the frame, and specifically illustrates a variation wherein a mounting clip can have a part thereof clampingly held between the opposed beveled surfaces which are joined to define the corner of the pad internal support structure.
Figure 17:
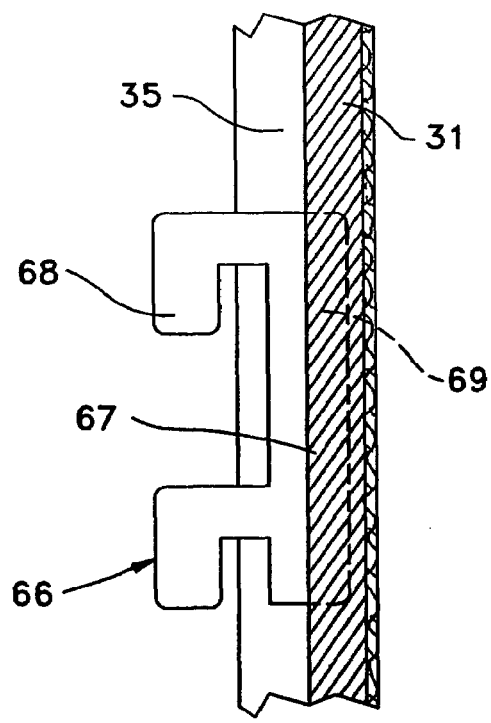
FIG. 17 is a fragmentary elevational view taken generally along line 17-17 in FIG. 16.

The improved cover pad 21 of this invention can also be provided with mounting clips 66 (FIGS. 16 and 17) associated therewith, which clips are secured between the opposed groove sidewalls during the folding of the edge flanges so as to protrude rearwardly from the cover pad for suitable engagement with the frame. One example of a suitable clip 66 is illustrated in FIGS. 16-17 and includes a main flange 67 which projects rearwardly from the rear surface of the center pad part 23 and has suitable hooks 68 or other fastening structure associated therewith for engagement with appropriate slots or structures associated with the panel frame. The clip 66 additionally has a mounting flange 69 which protrudes at an angle relative to the flange 67 and is positionable in the groove so as to be fixedly clamped between the opposed beveled surfaces 36 and 37 when the appropriate edge flange, such as flange 35, is folded and secured in the frame-defining position. One or more such clips 66 can be clamped in vertically spaced relationship along each of the vertical edge flanges 34-35 for engagement with slots associated with the frame uprights 15, or alternatively such clips can be associated with the horizontal edge flanges 32-33 and can be provided with suitable hooks or the like for engagement with the horizontal beams associated with the panel frame.

Figure 18:
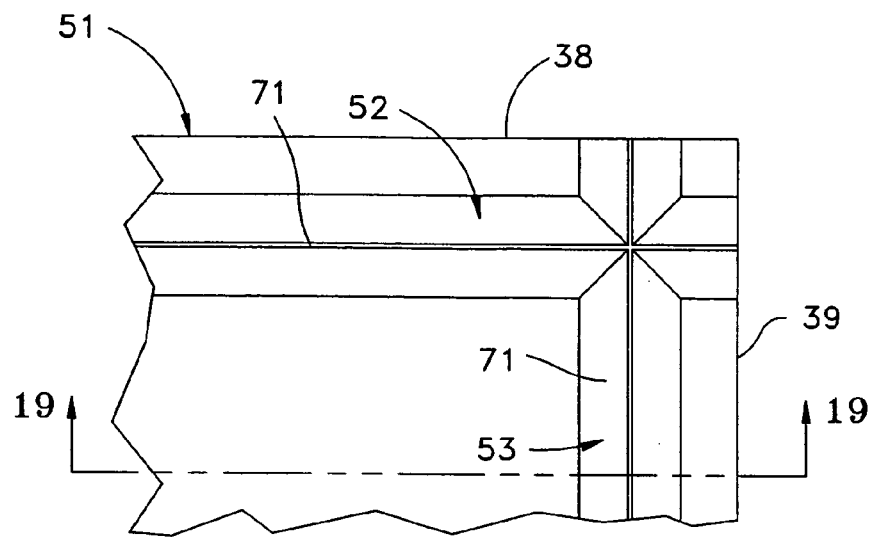
FIG. 18 is an enlarged fragmentary elevational view showing one corner of the grooved side of the blank but illustrating a modified configuration of the V grooves formed therein.
Figure 19:
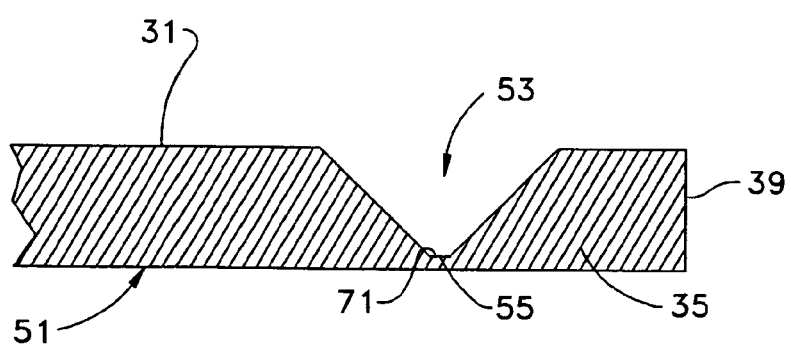
FIG. 19 is a cross-sectional view taken generally along line 19-19 in FIG. 18 and illustrating the cross section of the modified V groove.

While the V grooves such as the grooves 52 and 53 described above can terminate in a rather sharp apex if desired, nevertheless it is believed preferable to provide the groove with a narrow flat surface at the apex. In this regard, attention is directed to FIGS. 18-19 which illustrate a preferred cross section of the V groove. The apex of the V groove, as illustrated in FIG. 19, rather than being sharp is instead provided with a narrow but generally flat wall or surface 71 which can be generally parallel with but spaced a small distance from the front surface of the blank so as to define the narrow bridge 55 therebetween. This configuration of the V groove is believed easier to manufacture due to the ease of maintaining the shape and sharpness of the tool used for forming the V groove. In addition, this configuration additionally provides a small clearance or gap between the opposed tapered end surfaces 62-63 when the adjacent vertical and horizontal flanges are folded into their frame-defining position, which small clearance or gap facilitates the passage of excess corner fabric therebetween when the corner fabric is tucked and clamped between the frame corner in the manner illustrated by FIG. 10.

Referring now to FIGS. 22-23, there is illustrated a variation of the embodiment shown by FIGS. 20-21, but which additionally incorporates therein the feature of providing the apex of the V-groove with a widened flat as described above relative to FIG. 19.

More specifically, the variation of the blank 51' shown in FIGS. 22-23 is constructed substantially identical to the blank illustrated by FIGS. 20-21 except that the apex of the groove 53' is defined by a generally flat wall or surface 71' which is defined substantially at the inner surface of the surface layer 77, which surface layer 77 defines the narrow bridge section 55', the latter defining the flat apex surface 77 on the one side thereof. Providing the apex of the groove with this widened flat surface 71' is advantageous with respect to providing a small clearance or gap between the opposed tapered end surfaces of adjacent vertical and horizontal flanges (such as surfaces 62-63 in FIG. 10), which gap facilitates accommodating the folded corner material, and also facilitates the securing of an attachment clip, such as clip 66 illustrated in FIG. 23, between the opposed tapered edge surfaces defined between the center and edge parts of the blank. The providing of the flat surface 71 at the apex of the V-groove also further assists with respect to defining a rounded exterior corner 78 by providing additional space and length of material so as to accommodate folding and hence permit forming of the rounded exterior corner.

The arrangement of FIGS. 22-23, while it may be defined either by R board or gypsum board as discussed above relative to FIGS. 20-21, and may be used to define a frame wherein the outer frame surface is defined by the outer layer 77 of the blank, it also will be appreciated that this variation can additionally have a flexible covering 42' secured to the grooved blank as illustrated by FIG. 2, which blank is thereafter handled and folded in the same manner described above so that the exterior covering 42' is also folded into and clamped at the corners of the frame.

Figure 24:
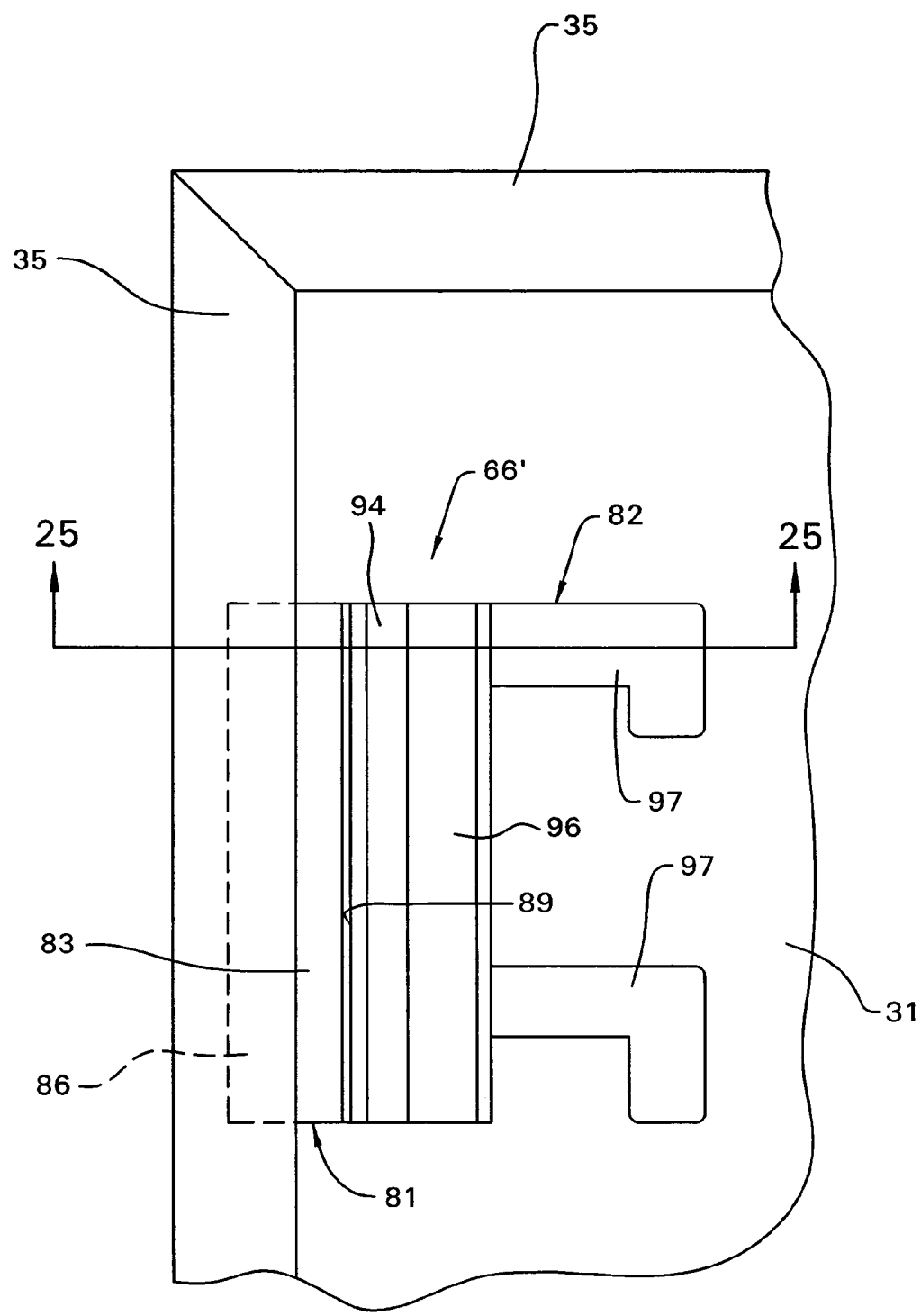
FIG. 24 is an enlarged fragmentary view showing the back of the assembled pad and mounting thereon a modified attachment clip, the latter being shown in a folded shipping position.

Referring now to FIGS. 24-26, there is illustrated an improved attachment clip 66' which can be secured to the cover pad 21 of the present invention during the forming thereof. The attachment clip 66' is constructed of two primary parts, namely a mounting part 81 which fixedly attaches to the frame of the cover pad, and an attachment or hook part 82 which is adapted for engagement with an upright support or frame, such as the slotted rail or post 15 shown by FIG. 2. The clip or hook part 82 is hingedly joined to the mounting part 81 so as to be moveable between a shipping and storing position (as shown in FIG. 25) wherein it is folded downwardly so as to be generally within the shallow recess defined within the interior of the back surface of the cover pad, and a use position wherein it is unfolded so as to project rearwardly (as shown in FIG. 25) for engagement with openings associated with a suitable support such as the upright shown in FIG. 2.

The mounting part 81 includes a generally elongated L-shaped positioning body 83 adapted for disposition within an interior rear corner of the frame so as to extend lengthwise therealong through a selected length, as shown by FIG. 24. The L-shaped positioning body 83 has a base leg 84 which overlies the rear surface of the center pad part 31', and a side leg 85 which overlies the inner surface of the edge part 35'. A generally flat flange 86 is cantilevered outwardly from the apex of the positioning body 83 and is clampingly held between the opposed angled surfaces defined on the pad parts 31' and 35' when the latter are folded into the frame defining position.

The positioning body 83 has an outer leg or flange 87 which is cantilevered inwardly in generally parallel relationship to the base leg 84, and this latter flange 87 in turn has a latching flange or leg 88 cantilevered inwardly therefrom in a direction toward but terminating short of the opposed base leg 84.

The base leg 84, adjacent the free edge thereof, is joined to the clip part 82 by a hinge 89 which extends lengthwise generally parallel to the inner surface of the frame edge part 35'. This hinge 89 is effectively joined to a latch or lock plate 91 associated with the inner end of the clip part 82. This latch plate 91, when the clip part 82 is in the folded position shown by FIG. 25, is cantilevered generally outwardly from one end of a main body part 92, the latter having a generally flat surface 93 on one side thereof disposed for abutting engagement with the rear surface of the center frame part 31 when the clip part 82 is in the open position. This main body 92 also defines a recess 94 which opens inwardly thereof from the side opposite the abutment surface 93, which recess 94 is defined generally between the latch plate 91 and an opposed side wall 95. A further plate 96 is joined to and projects generally outwardly from the main body 92, and this plate 96 in turn joins to a clip such as a hook 97 which is cantilevered outwardly away from the hinge 89.

When in the folded or closed position illustrated by FIG. 25, the clip part 82 is disposed substantially entirely within the recess defined by the surrounding rear surface 135 of the frame, whereby the abutment surface 93 substantially abuts the rear surface of the frame center part 31, and the plate 96 and clip 97 are effectively cantilevered inwardly away from the edge part 35 so as to be generally flush with or below a plane defined by the rear frame surface 135. This facilitates stacking, storing and shipping of the pads prior to their being assembled at a job site.

To mount the pad to a support such as a slotted upright, the clip part 82 is manually gripped and swung upwardly through an angle of about 90° into the locked use position shown by FIG. 26. When being swung into this latter position, the clip part 82 hingedly swings about the hinge 89, and the cantilevered latch plate 91 engages and deflects the latching flange 88 until the clip part 82 reaches its use position wherein the latch plate 91 substantially seats against the base leg 84, and the recess side wall 95 substantially seats against or closely overlies the exposed outer surface of the flange 87, as illustrated by FIG. 26. When in this latter position, the latching flange 88 resiliently snaps back into its suspended position so that it is positioned directly over the upper surface of the latch plate 91, thereby effectively locking the clip part 82 in the unfolded use position by preventing reverse swinging movement of the part 82.

The attachment clip 66' is preferably constructed of a plastics material utilizing forming techniques which enable the parts 81 and 82, as well as the hinge 89 joining the parts together, to be integrally and effectively monolithically joined as a one-piece assembly. In this respect, the base leg 84 may be defined by upper and lower layers formed by a co-extrusion, with the upper layer being monolithically joined to the clip part 82 through the hinge 89.

In the present invention, when referencing the covering of the blank with a thin flexible covering sheet, it will be recognized that such thin flexible covering sheet is one which has effectively no inherent rigidity by itself in terms of its ability to retain a predefined shape, it being recognized that thin covering sheets of cloth, fabric or foil, specifically thin plastic foils, exhibit these properties. This is in contrast to thin sheets of materials such as sheet metals and the like which, while they do exhibit at least limited flexibility, they nevertheless do have sufficient rigidity to in most cases retain a predefined shape absent some significant external deforming force.

While the improved cover pad 21 of this invention and the manufacturing process therefor is particularly desirable for cover pads employing a thin flexible covering sheet formed of fabric or cloth or equivalent, it will be appreciated that other thin sheetlike covering materials which are at least partially self supporting but which have at least limited flexibility or bendability can also be utilized to define cover pads in accordance with the present invention. For example, other sheet materials which may be useable for defining cover pads according to the present invention include thin metal foils or thin high pressure laminates which can be bent to define corners, particularly when heated, although such laminates may be useable only when a more gradual or rounded corner is provided, such as the beveled corner illustrated in FIGS. 14-15.

In the present invention, when referencing the covering of the blank with a thin flexible covering sheet, it will be recognized that such thin flexible covering sheet is one which has effectively no inherent rigidity by itself in terms of its ability to retain a predefined shape, it being recognized that thin covering sheets of cloth, fabric or foil, specifically thin plastic foils, exhibit these properties. This is in contrast to thin sheets of materials such as sheet metals and the like which, while they do exhibit at least limited flexibility, they nevertheless do have sufficient rigidity to in most cases retain a predefined shape absent some significant external deforming force.

With the cover pad of this invention, the resulting pad possesses substantial strength and rigidity, and at the same time the material defining the substrate or blank can have at least some sound-absorbing properties so as to at least partially minimize either reflection or transmission of environmental noise, and at the same time permit for more efficient and time-saving attachment of the fabric to the substrate while additionally resulting in a fabric-covered pad having improved uniformity of appearance and particularly improved formed fabric corners. The material defining the substrate of the pad, namely the material defining the blank 51, is also economical and hence further facilitates the efficient and economical manufacture of the cover pad.

While the invention as discussed above relates to a blank which is formed, as by being cut, from a larger sheet of material, it will be appreciated that the blank can be directly formed as a flat sheetlike member wherein the grooves and the recessed corners are formed during formation of the blank. For example, the blank may be die cut from a larger sheet of material so as to create the corner recesses during forming of the blank, prior to grooving thereof. With respect to the grooves, in some situations they may be molded or pressed into the flat blank, particularly when the flat blank is initially formed so as to have the desired configuration suitable to permit folding of the edges.

In addition, the substrate defining the blank may include therein binding fibers that act like an adhesive for adhering fabric to the face of the blank, thereby eliminating the need for a secondary operation of applying a separate adhesive to the board prior to securement of the fabric or covering.

Figure 10:
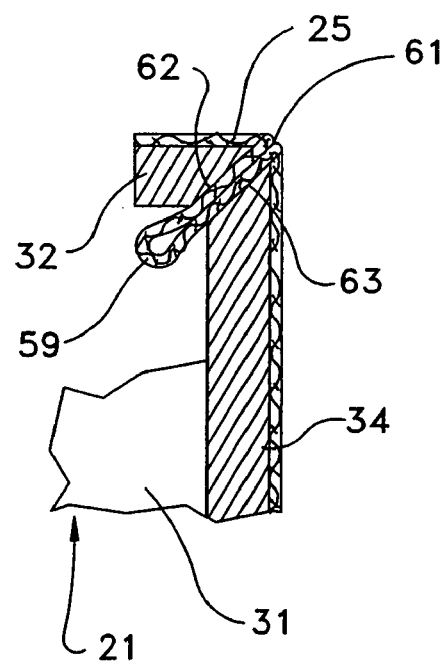
FIG. 10 is a fragmentary rear elevational view showing one corner of the cover pad after assembly thereof and specifically illustrating the excess corner fabric tucked and clampingly held between opposed ends of the folded edge flanges defining the rigid frame.

While the invention as described above principally shows the fabric being wrapped around the edge of the blank and terminating at an outer edge thereof, similar to that illustrated in FIG. 10, it will be appreciated that the fabric can be totally wrapped around the foldable edge parts so that the edge portion of the fabric is trapped inside the groove when the edge parts are folded into the assembled position.

It is further contemplated that small electrical wires can be disposed within the grooves, such as in undercuts therein, whereby the wires will be trapped in and extend lengthwise along the grooves when the edge parts are in the assembled folded position, thereby enabling electrical wires to be more readily associated with the wall panel so as to extend lengthwise along the cover pads, with the wires of longitudinally adjacent cover pads being electrically adjoined on the inner sides of the cover pads by a suitable electrical jumper which can be provided with suitable releasable connectors for engagement with similar connectors formed inside the cover pads. If necessary or desirable, a part of the folded edge of the cover pad, such as the upright folded edges, can be partially removed to permit passage of electrical wires between and behind adjacent covers.

While it is believed that physically securing the folded edge strips to the main center part of the blank is a preferred construction for a pad or wall member according to the present invention, nevertheless it will be appreciated that in some instances it may be desirable to form the pad or wall covering in the same manner, but not effect permanent securement of the edge parts in a folded position. For example, if used with an appropriate frame, the folded edge parts in the folded position can be disposed for fixed securement with the frame so as to hold the cover pad thereto, without effecting adhesive securement of the edge parts in the folded position.

While it is contemplated that in most situations the grooves formed in the blank material will not penetrate entirely through the thickness of the blank, nevertheless in some situations the latter may be necessary, although such is not believed desirable.

While the invention as described above has referenced the forming of a cover or wall pad, such as for use in defining an exterior surface of an upright wall, such as a portable wall panel, it will be appreciated that the formed pad or product of the present invention can also be formed for other uses, including uses wherein the resulting wall pad may be oriented in a disposition other than vertical or the formed wall product is part of a three-dimensional structure other than a wall.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An upright interior wall having a frame and one or more cover pads mounted on an upright side of said frame for defining an exterior side surface of said wall, said cover pad comprising:

a platelike main pad part having a beveled edge surface extending therearound;

a ringlike frame fixed to and extending around said main pad part, said frame being defined by elongate edge flange parts which extend along and are fixed to each edge of said main pad part, each said edge flange part having a beveled edge surface which is opposed to and overlies a respective beveled edge surface of the main pad part;

said main pad part and said edge flange parts being initially defined by a one-piece flat monolithic platelike blank which has a thick center core layer having opposed side surfaces thereon respectively adhered to thin front and rear facing layers which respectively define front and rear exterior surfaces of the blank;

said blank having grooves formed inwardly therein from the rear surface thereof adjacent and running parallel with each edge of said blank, each said groove being generally V-shaped in cross-section and opening inwardly from the rear surface through the rear layer and through substantially the entire thickness of the center core layer so that the apex of the groove terminates generally at an interface between the core layer and the front facing layer so that the front facing layer defines a narrow bridge at the apex which functions as a hinge point enabling the edge flange part to be rotated about 90° relative to the main pad part so that the beveled edge surface on the respective edge flange part moves into opposed and substantially engaged relationship with the respective beveled edge surface of the main pad part and is adhesively engaged therewith;

the apex of the groove being defined by a generally flat surface as defined by said front facing layer to initially provide a small gap between the opposed beveled edge surfaces as defined on the main pad part and the respectively opposed edge frame part;

a plurality of mounting clips fixedly attached relative to the main pad part for permitting the pad to be releasably engaged with the frame, each said mounting clip being secured adjacent a rear side of the pad and including a platelike mounting part clampingly held between the beveled edge surface of the main pad part and the opposed beveled edge surface of the respective edge flange part when these opposed beveled edge surfaces are in engaged relationship; and said mounting clip including a clip part which is joined to said mounting part and is cantilevered outwardly away from said rear surface so as to be positioned for engagement with the wall frame, said clip part as it protrudes outwardly away from the rear surface terminating in a free end part which protrudes rearwardly a greater extent than an adjacent said edge frame part, the free end part of said clip part defining thereon an engagement structure for releasable engagement with the frame of the wall.

2. A wall according to claim 1, wherein said mounting clip includes a hinge structure pivotally joining said clip part to said mounting part, said hinge structure being positioned in close proximity to the rear surface of said main pad part and extending generally parallel with said rear surface to enable the clip part to be swingably displaced between a folded storage position wherein the clip part is positioned closely adjacent and generally overlies the rear surface and a use position wherein the clip part protrudes generally transversely outwardly away from the rear surface of the main pad part.

3. A wall according to claim 2, wherein the mounting clip includes a latch structure which is disposed close to the hinge structure and cooperates between the clip and mounting parts when the clip part is moved into said use position for retaining the clip part in said use position.

4. An upright interior wall having a frame and one or more cover pads mounted on the upright side of said frame for defining an exterior side surface of said wall, said cover pad comprising:

a platelike main pad part having a beveled edge surface extending therearound;

a ringlike frame fixed to and extending around said main pad part, said frame being defined by elongate edge flange parts which extend along and are fixed to each edge of the main pad part, each said edge flange part having a beveled edge surface which is opposed to and overlies a respective beveled edge surface of the main pad part;

said main pad part and said edge flange parts being initially defined by a one-piece flat monolithic platelike blank which has grooves formed inwardly therein from a rear surface thereof adjacent and running parallel with each said edge of said blank and, at the bottom of the grooves, defining hinge points which enable the edge flange parts to be rotated about 90 degrees relative to the main pad part so that the beveled surfaces on the respective edge flange parts move into opposed and substantially engaged relation with the respective beveled edge surfaces of the main pad part and are adhesively engaged therewith;

a one-piece sheet of thin flexible covering material overlying the exterior non-grooved face of the main pad part and exterior side surfaces of the folded edge flange parts and fixedly secured to at least said edge flange parts, the thin flexible covering material having substantially no inherent rigidity for retaining a predefined shape, and corner portions of said sheet being tucked and clampingly held between opposed ends of the folded edge flange parts to define a covered corner on the cover pad; and a plurality of mounting clips fixedly attached to the cover pad for permitting the pad to be releasably engaged with the frame, each said mounting clip being secured to the pad adjacent a rear side thereof in close proximity to one of the edge frame parts;

said mounting clip including a platelike mounting part fixedly clampingly held between the beveled edge surface of the main pad part and the opposed beveled edge surface of the edge flange part when the opposed beveled edge surfaces are disposed in opposed and substantially engaged relationship to thereby effect clamping engagement of the platelike mounting part therebetween;

said mounting clip further including a clip part which is joined to said mounting part through a hinge structure which is disposed closely adjacent the rear surface of the main pad part and extends generally parallel thereto, said hinge structure permitting said clip part to be swingably moved through an angle of substantially 90 degrees from a storage position wherein the clip part is positioned closely adjacent and generally overlies the rear surface of the main pad part and a use position wherein the clip part is cantilevered transversely outwardly away from said rear surface, said clip part mounting thereon a frame engaging structure adjacent an outer free end of the clip part so that the frame engaging structure is releasably engagable with the wall frame when the clip part is in said use position, said frame engaging structure being positioned rearwardly of a rearward most extremity of an adjacent edge frame part when the clip part is in said use position.

5. A wall according to claim 4, wherein said mounting clip includes a latch structure cooperating between said mounting and clip parts for engagement when the clip part is moved into said use position to retain the clip part in said use position.

6. A wall according to claim 5, wherein said mounting clip is a one-piece plastic assembly and the hinge structure comprising a plastic living hinge connected between said mounting and clip parts, said latch structure including first and second protruding parts respectively mounted on the clip and mounting parts and disposed in close proximity to said hinge structure.

* * * * *